Feb. 28, 1950 G. H. HOLLAND 2,498,920
IMPLEMENT FOR TYING KNOTS
Filed June 24, 1947
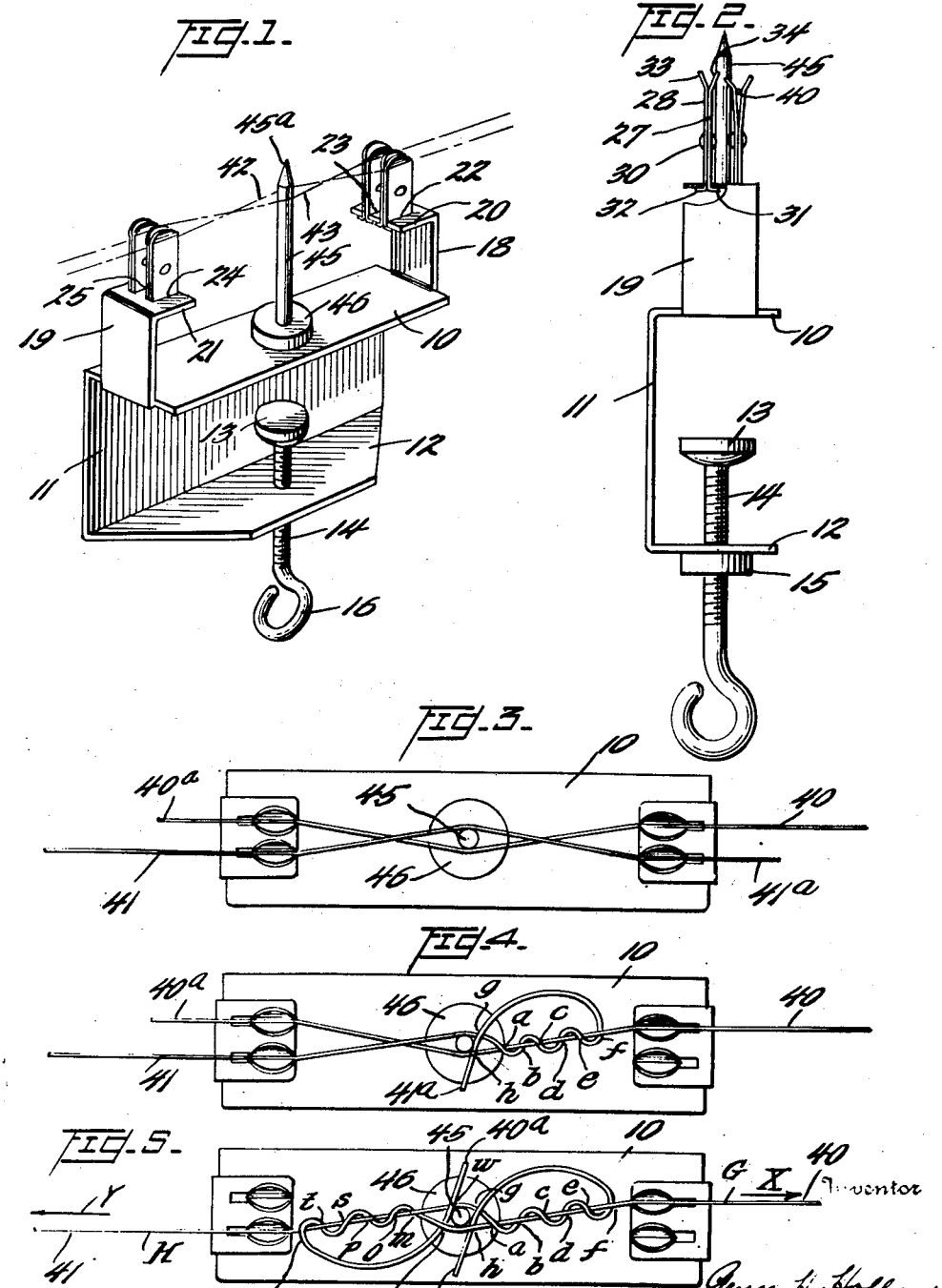

Patented Feb. 28, 1950

2,498,920

UNITED STATES PATENT OFFICE 2,498,920

IMPLEMENT FOR TYING KNOTS

George H. Holland, Hazleton, Pa.

Application June 24, 1947, Serial No. 756,753

2 Claims. (Cl. 289—17)

This invention relates to an implement for tying knots which, while of general utility and adapted to be utilized in the tying of a wide variety of knots, is particularly useful in the fabrication of lines and equipment to be used by fishermen.

Thus for example, in the fashioning of a seven and one half (7½) foot tapered leader of gut or nylon five knots must be tied, four of which are known as barrel knots and the fifth as a loop knot. Tying of such knots, and other generally similar types of knots, is not easy, especially for the inexperienced, and particularly where the thread or line is relatively stiff, as when it is fabricated of gut or nylon. The purpose of the present invention is to provide means to be used by the fabricator of fishing equipment or the like by means of which the tying of knots is rendered substantially less difficult, the tying of barrel knots in particular being facilitated, and which will insure greater uniformity. The implement is intended for both amateur and professional use, is light in weight, small in bulk, inexpensive and readily transportable. It may be placed in the ordinary fisherman's kit and transported from place to place, being utilized when needed in the fashioning of tapered leaders and the like to replace those lost or destroyed.

A preferred form of the implement is illustrated in the accompanying drawings and will be described in detail, but it will be appreciated by those skilled in the art that minor alterations may be made for the purpose of more particularly adapting the implement for the tying of certain species of knots or for the tying of knots in materials of unusual character, all without departure from the invention.

In the drawings:

Figure 1 is a perspective view of the implement;

Figure 2 is an end elevation;

Figures 3, 4 and 5 are similar plan views, three figures being provided in order that certain operations performed in the tying of a barrel knot may be indicated, in proper sequence.

The implement can most conveniently be used when provided with means for attachment to the edge of a table or other stationary object which may be available and, for that reason, is provided with a clamp. The base plate of the implement is indicated generally at 10 in the drawings and, to provide means for clamping this base plate to a supporting member, the clamp, comprising downwardly projecting member 11 terminating in flange 12 parallel to the base plate 10, is provided. Preferably the base plate 10, web 11 and flange 12 are integral and comprise portions of a metallic sheet which has been fashioned by stamping and bending operations into the form shown in the drawings. The base plate 10 comprises the stationary jaw of the clamp and the movable jaw is indicated at 13, being a disc like member pivotally mounted upon the upper end of the vertically disposed screw 14. The thread of screw 14 meshes with the thread formed on the inner surface of a cylindrical aperture in the annular member 15 suitably secured to the undersurface of flange 12, the threaded aperture in member 15 being in registry with the circular aperture in the flange 12. The lower end of the screw 14 is provided with a hand grip in the nature of loop 16, by means of which the screw may be readily turned manually.

Extending upwardly from the ends of the rectangular base plate 10 are vertical flanges 18 and 19 which preferably comprise upturned portions of the base plate and are integral therewith, flanges 18 and 19 terminating in horizontally and inwardly projecting portions 20 and 21 which are disposed in a parallel plane of the base plate 10. Projection 20 is provided with slots 22 and 23, extending parallel to the major axis of the base plate and the inturned horizontal terminal end 21 of the implement is likewise provided with parallel slots, these slots being indicated at 24 and 25.

Within each of the four slots thus formed is positioned a device for yieldingly gripping or detachably holding a thread or cord. Each such device preferably includes two blades of resilient metal, indicated at 27 and 28 inclusive, these blades or plates being secured together to form one integral unit by means of a rivet, such a rivet being indicated at 30. As may be clearly observed in Figures 1 and 2, blades 27 and 28 are provided with outwardly turned flanges 31 and 32 at their lower ends and outwardly and upwardly diverging portions 33 and 34 at their upper ends. The inner faces of the divergent upper end portions 33 and 34 comprise thread or cord engaging surfaces, functioning to guide toward the bottom of the V-shaped notch which they together form, any thread or cord which may be moved downwardly into that notch from above. Inasmuch as members 27 and 28 are fabricated of resilient metal they may be spread apart, as shown in Figure 2, if a thread or cord such as indicated at 40 is forced downwardly between them. The spring action of the separated blades is such that any cord so positioned will be resiliently clamped or gripped between the blades 27 and 28, when so positioned, and will be retained until pulled out by the operator. Thus each such device, comprising two springs riveted together and positioned as shown, constitutes means for receiving and releasably gripping a thread or cord.

The thread gripping devices are four in number and may be said to be positioned at the four corners of a rectangle. The aligned devices at two such corners will receive and detachably hold at spaced points a thread such as the thread 40 and the second pair of aligned devices will receive and detachably hold a second thread such as that indicated at 41, the reaches of thread 40 and 41 intermediate the points of support being preferably taut and lying on the sides of rod 45 opposite points of support, crossing each other between the rod and each of the two sets of thread gripping devices and lying in a plane practically parallel to supporting base 10. Thread locations such as described are indicated by the dot and dash lines 42 and 43 in Figure 1. The end of thread 40 is indicated at 40a and the end of 41 at 41a.

It will be observed that a cylindrical rod or post 45 projects upwardly from a disc 46 mounted upon base 10, this rod being circular in cross section and having a tapered upper end 45a. It is positioned centrally of the rectangle defined by the four thread gripping devices and passes upwardly, midway between thread locations 42 and 43, to a point substantially above the horizontal plane which includes these thread locations, as shown in Figures 1 and 2.

In the use of the implement in the formation of a barrel knot two threads such as 40 and 41 are positioned as shown in Figure 3. Thread 41 may then be grasped at or near its end (41a) and pulled out of the adjacent thread holding device, then wrapped around the associated thread 40 which remains detachably secured in position on the two spaced thread holding devices, thread 41 for instance being passed under thread 40 at b, d and f (Figure 4) and over thread 40 at a, c and e, the end 41a then being passed over itself g and under 40 at h. When the end is released it will, of course, tend to spring back to a straight or substantially straight condition, being restrained from doing so by contact with the holding post 45 as clearly shown in Figure 4 of the drawings. The free end (40a) of thread 40 is then released from its holding device and wrapped around thread 41 in a similar manner but thread 40 being under thread 41 the operation is slightly changed, in that thread 40 is passed under thread 41 at m, p and t (Figure 5) and over thread 41 at o, s and u and the end 40a being passed under itself at v and over 41 at w. The knot is now loosely formed substantially as shown in Figure 5 of the drawings, the end 40a of thread 40 likewise resting against post 45. After this has been accomplished the operator may grasp threads 40 and 41 at grasping positions G and H, and thereby form knot by simply applying pulling force and moving thread 40 longitudinally in the direction of the arrow X (Figure 5) and thread 41 in the direction of the arrow Y and by a following lifting movement remove threads 40 and 41 from two gripping devices which will also remove threads from post 45, finishing the knot. The knot may be brought to the desired tightness by continuing to pull threads 40 and 41 in the directions X and Y, respectively. The knot is thus quickly formed and it is clear that even an inexperienced person may with facility tie a barrel knot in the manner stated, with the aid of the implement described.

Loop knots and other types of knots may likewise be formed on the implement, thus providing the fisherman or professional manufacturer of fishing equipment with a small, lightweight, inexpensive and readily transportable implement of the class described.

Having thus described the invention, what is claimed as new and desired to be secured by Letters Patent is:

1. In a device of the class described, in combination a flat rectangular base member, means supported on the base member for yieldingly supporting two adjacent threads parallel to one another, said means comprising flanges extending vertically upward from the ends of said base member, said flanges terminating in inwardly projecting portions disposed parallel to said base member, a pair of resilient clips supported on each of said inwardly projecting portions, the clips of each said pair being spaced apart laterally with respect to the said base member at the same distance, the clips of the pairs proximate to one side of said base member being spaced apart the same distance as the clips proximate to the other side thereof, all said clips being positioned in the same horizontal plane, and a vertically disposed rod member mounted upon said base member and extending upwardly therefrom to a point above the thread engaging portions of said clips, said rod member being mounted at substantially the center of the said base member.

2. In a device of the class described, in combination, a flat rectangular base member, two pairs of resilient clips for supporting two adjacent threads parallel to one another, each of said clips comprising two blades of resilient material secured together and provided at their distal ends with outwardly and upwardly disposed portions adapted to receive and guide a thread downwardly into an engagement between lower portions of the blades, means for supporting one pair of said clips toward one end of said base member and the other pair toward the other end thereof, the clips of each said pair being spaced apart laterally of said base member at the same distance, the clips of the pairs proximate to one side of said base member being spaced apart the same distance as the clips proximate to the other side thereof, all said clips being positioned in the same horizontal plane, and a vertically disposed rod member mounted upon said base member and extending upwardly therefrom to a point above the thread engaging portions of said clips, said rod member being mounted at substantially the center of the said base member.

GEORGE H. HOLLAND.

REFERENCES CITED

The following references are of record in the file of this patent:

UNITED STATES PATENTS

| Number | Name | Date |
|---|---|---|
| 337,637 | Thies | Mar. 9, 1886 |
| 1,452,906 | Butler et al. | Apr. 24, 1923 |

FOREIGN PATENTS

| Number | Country | Date |
|---|---|---|
| 658,735 | Germany | Mar. 24, 1938 |